(12) United States Patent
Yu et al.

(10) Patent No.: US 10,082,391 B2
(45) Date of Patent: Sep. 25, 2018

(54) ROTATIONAL SENSORS INCLUDING IONIC LIQUIDS AND METHODS OF MAKING AND USING THE SAME

(71) Applicants: Hongyu Yu, Chandler, AZ (US); Mengbing Liang, Mesa, AZ (US)

(72) Inventors: Hongyu Yu, Chandler, AZ (US); Mengbing Liang, Mesa, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 162 days.

(21) Appl. No.: 15/292,869

(22) Filed: Oct. 13, 2016

(65) Prior Publication Data
US 2017/0102235 A1  Apr. 13, 2017

Related U.S. Application Data

(60) Provisional application No. 62/240,691, filed on Oct. 13, 2015.

(51) Int. Cl.
*G01C 9/18* (2006.01)
*G01B 13/18* (2006.01)

(52) U.S. Cl.
CPC ............. *G01C 9/18* (2013.01); *G01B 13/18* (2013.01); *G01C 2009/182* (2013.01)

(58) Field of Classification Search
CPC .......................................................... G01C 9/18
USPC ........................................ 33/366.15–366.19
See application file for complete search history.

(56) References Cited

U.S. PATENT DOCUMENTS

| | | | | |
|---|---|---|---|---|
| 3,442,023 A | * | 5/1969 | Remington | G01C 9/18 33/366.22 |
| 3,985,033 A | * | 10/1976 | Ford | G01C 9/06 318/649 |
| 4,747,216 A | * | 5/1988 | Kelly | G01C 9/10 33/1 PT |
| 4,866,850 A | * | 9/1989 | Kelly | G01C 9/06 33/1 PT |
| 4,914,831 A | * | 4/1990 | Kanezashi | G01B 3/12 33/780 |
| 6,625,896 B1 | * | 9/2003 | Olson | G01C 9/06 33/366.11 |
| 2018/0073874 A1 | * | 3/2018 | Eskew | G01C 9/18 |

* cited by examiner

*Primary Examiner* — G. Bradley Bennett
(74) *Attorney, Agent, or Firm* — Quarles & Brady LLP

(57) ABSTRACT

Sensors for measuring rotation about an axis are disclosed, along with methods of making and using the same. The sensors can utilize ionic liquids and electrodes that provide a unique electrical signal at each angle of rotation about an axis. The sensors can include a solid structure with a channel that circumnavigates the axis, electrodes disposed within the channel, and an ionic liquid positioned within the channel.

20 Claims, 14 Drawing Sheets

ROTATIONAL SENSORS INCLUDING IONIC LIQUIDS AND METHODS OF MAKING AND USING THE SAME

CROSS-REFERENCE TO RELATED APPLICATIONS

This application is based on, claims priority to, and incorporated herein by reference for all purposes U.S. Provisional Patent Application No. 62/240,691, filed Oct. 13, 2015.

STATEMENT REGARDING FEDERALLY SPONSORED RESEARCH

N/A

BACKGROUND

The present disclosure relates to systems and methods for measuring tilting angle and for systems and methods for manufacturing and using tilting angle sensing systems.

An inclinometer is a gravity-sensitive device which is capable of measuring the tilting angle. With the development of consumer electronic devices and devices for exploration of the Earth and outer space, development of a high quality inclinometer with high resolution and reliability under harsh environmental detection is needed.

Because the inclinometer is sensitive to gravity, achieving high performance inclinometers with traditional micro-electromechanical systems (MEMS) solid mass-spring systems due to the limitation of mass proof. Accordingly, improved systems and methods are needed.

BRIEF SUMMARY

The present disclosure overcomes the aforementioned drawbacks by providing a sensor utilizing an ionic liquid based electrolyte and methods of making and using the same.

In one aspect, the present disclosure provides a sensor for measuring rotation about an axis. The sensor can include a solid structure, a first anode, a first cathode, an ionic liquid, and a controller. The solid structure can include a channel that circumnavigates the axis. The first anode and the first cathode can be disposed within the channel. The ionic liquid can be positioned within the channel. The ionic liquid can contact the first anode and the first cathode when the sensor is positioned such that the axis is at an angle of between 1° and 179° relative to a gravitational axis representing the force of gravity. The controller can be coupled to the first anode and the first cathode. The controller can be configured to apply a first non-zero voltage between the first anode and the first cathode. The controller can be configured to communicate a rotation sense signal corresponding to a rotation about the axis. The first anode and the first cathode can be configured to provide a unique rotation sense signal value at each angle of rotation about the axis.

In another aspect, the present disclosure provides a method of measuring rotation of an object about an axis using a sensor as described herein. The method can include one or more of the following steps: affixing the sensor to the object such that the axis is positioned at an angle that is between 1° and 179° relative to the gravitational axis; and measuring the rotation sense signal.

In yet another aspect, the present disclosure provides a method of making a sensor. The method can include one or more of the following steps: forming a solid structure including a channel that circumnavigates an axis; positioning a first anode and a first cathode within the channel; and introducing an ionic liquid to the channel. The ionic liquid can contact the first anode and the first cathode when the sensor is positioned such that the axis is at an angle of between 1° and 179° relative to a gravitational axis representing the force of gravity.

The foregoing and other aspects and advantages of the disclosure will appear from the following description. In the description, reference is made to the accompanying drawings which form a part hereof, and in which there is shown by way of illustration a preferred aspect of the disclosure. Such aspect does not necessarily represent the full scope of the disclosure, however, and reference is made therefore to the claims and herein for interpreting the scope of the disclosure.

DETAILED DESCRIPTION

Before the present invention is described in further detail, it is to be understood that the invention is not limited to the particular embodiments described. It is also to be understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context.

Variations of the term "comprising", "including", or "having" should be interpreted as referring to elements, components, or steps in a non-exclusive manner, so the referenced elements, components, or steps may be combined with other elements, components, or steps that are not expressly referenced. Embodiments referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

Numeric ranges disclosed herein are inclusive of their endpoints. For example, a numeric range of between 1 and 10 includes the values 1 and 10. When a series of numeric ranges are disclosed for a given value, the present disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

The present disclosure relates to systems and methods relating to molecular electronic transducer (MET) devices, which can be based on the movement of a conductive electrolyte and transduction of the liquid motion to an electronic signal by an electric-chemical reaction. The resulting devices are high performance tiling sensing devices.

Figure 1:
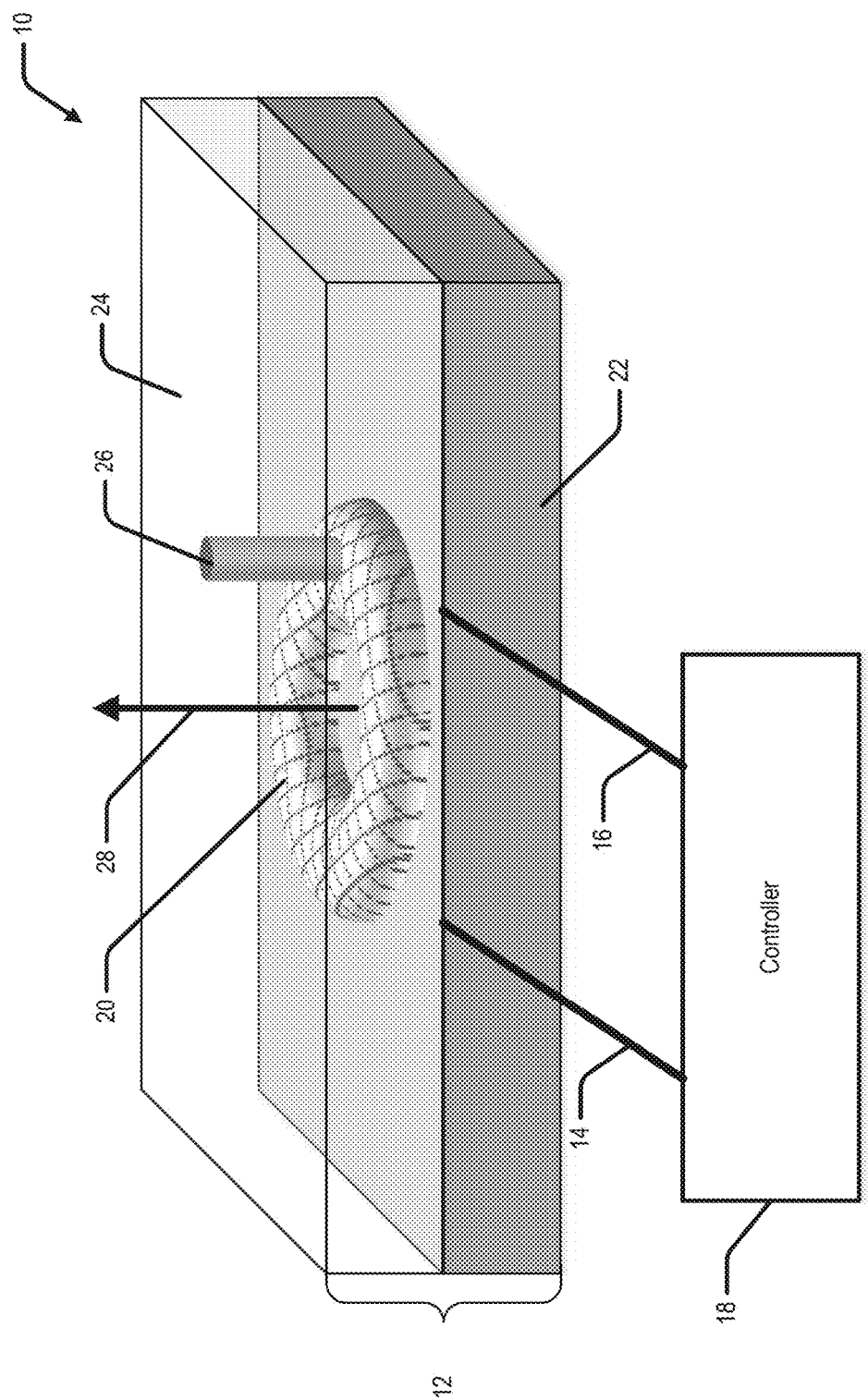
FIG. 1 is a sensor, in accordance with one aspect of the present disclosure.

Referring to FIG. 1, the present disclosure provides a sensor 10. The sensor 10 can include a solid structure 12, an anodic lead 14, a cathodic lead 16, and a controller 18, which can include various circuitry known to those having ordinary skill in the art. The solid structure 12 can include a channel 20 embedded therein. The solid structure 12 can be formed from a substrate 22 and a capping layer 24, which can be sealed to one another to form the solid structure 12 using methods known to those having ordinary skill in the art. The solid structure 12 can optionally include a valve 26 via which liquids can be introduced into and removed from the channel 20. The solid structure 12 can be configured to be rotatable around an axis 28.

Figure 2:
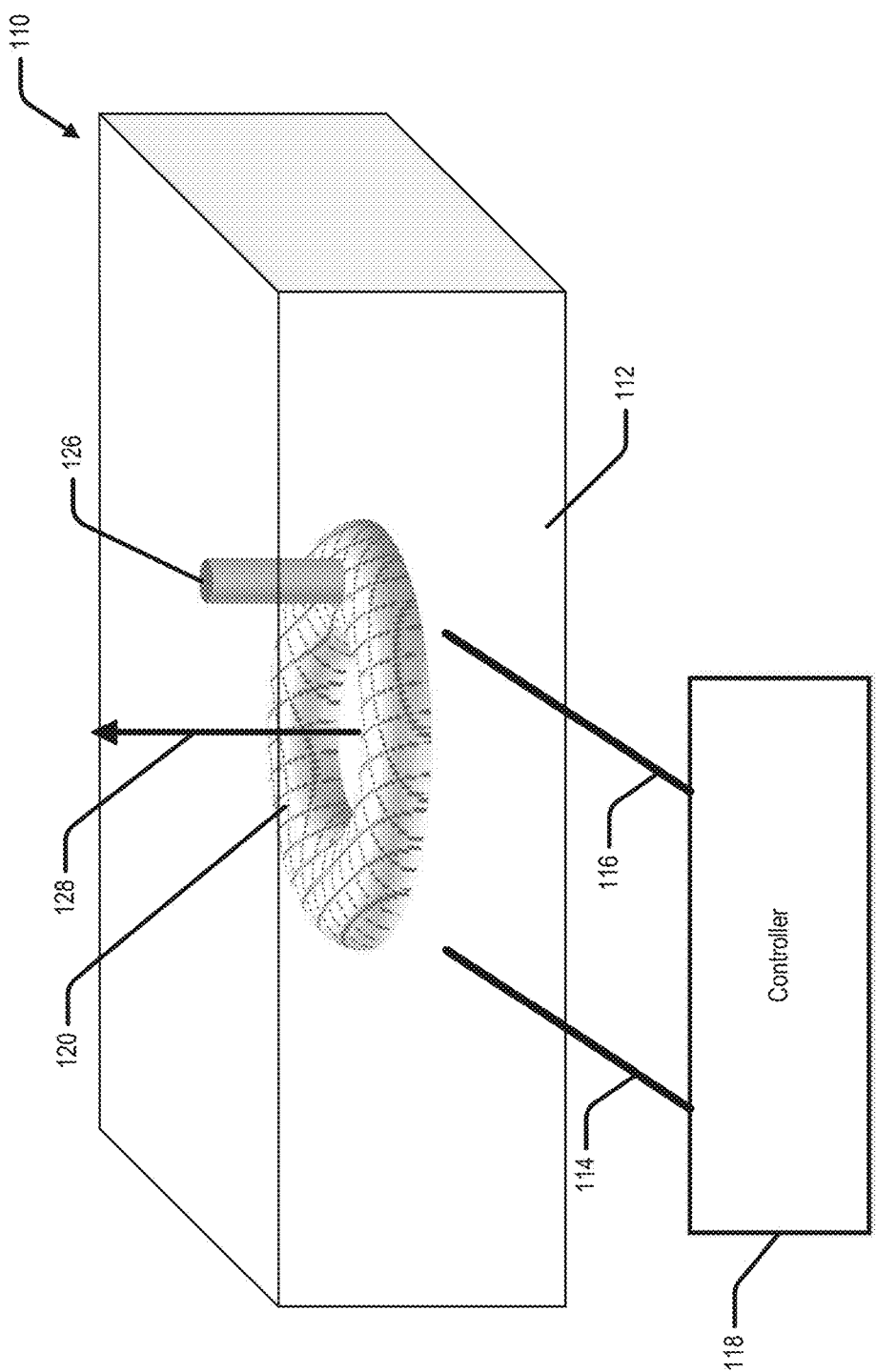
FIG. 2 is a sensor, in accordance with one aspect of the present disclosure.

Referring to FIG. 2, the present disclosure provides a sensor 110. The sensor 110 can include a solid structure 112, an anodic lead 114, a cathodic lead 116, and a controller 118, which can include various circuitry known to those having ordinary skill in the art. The solid structure 112 can include a channel 120 embedded therein. The solid structure 112 can be monolithic. The solid structure 112 can optionally include a valve 126 via which liquid can be introduced into and removed from the channel 120. The solid structure 112 can be configured to be rotatable around an axis 128.

It should be appreciated that the anodic lead 14, 114 and the cathodic lead 16, 116 can be configured to allow rotation of the solid structure 12, 112 without interrupting the electronic communication that they respectively establish with the anode and cathode. However, in some cases, the anodic lead 14, 114, the cathodic lead 16, 116 and other components that are external to the solid structure 12, 112 can be fixed relative to the solid structure 12, 112 and can rotate with the solid structure 12, 112. For example, the entirety of the sensor 10, 110 can be mounted to an external object for sensing rotation of the external object.

While sensor 10 forms the solid structure 12 from two pieces and sensor 110 forms the solid structure 112 from one monolithic piece, it should be appreciated that a variety of other arrangements can be achieved while remaining within the scope of the present disclosure. For example, the solid structure can be formed from three, four, five or more pieces in ways understood to those having ordinary skill in the art.

The anodic lead 14, 114 and the cathodic lead 16, 116 can be formed from a conductive lead material that is suitable for use with electronic devices. Examples of suitable conductive lead materials can include, but are not limited to, copper, gold, platinum, lead, other metals, conductive polymers, doped semiconductors, such as doped polysilicon, and the like. It should be appreciated that other conductive lead materials than those listed can be used without departing from the scope of the present disclosure.

In operation, the controller 18, 118 can be configured to communicate a rotation sense signal corresponding to a rotation of the sensor 10, 110 about the axis 28, 128. The controller can be a computer, a laptop computer, a personal device, such as a tablet, a smart phone, or another processor-containing device that is capable of controlling the sensor 10, 110 and interpreting electrical signals in the ways described herein.

The channel 20, 120 can have a circular shape in a plane normal to the axis 28, 128, with the axis 28, 128 emerging from the center of the circular shape, though other shapes and arrangements are contemplated. The channel 20, 120 can contain an anode, a cathode, and an ionic liquid, as discussed below. The anode, cathode, and ionic liquid have been omitted from FIGS. 1 and 2 for simplicity of representation, but all anode and cathode configurations that are described or illustrated elsewhere can be positioned within the channel 20, 120 of the solid structure 12, 112 and coupled to the respective anodic lead 14, 114 and cathodic lead 16, 116.

In certain aspects, the channel 20, 120 can have an internal volume of between 0.001 µL and 0.05 mL, including but not limited to, an internal volume of between 0.01 mL and 0.03 mL, or between 0.0015 mL and 0.025 mL.

In certain aspects, the channel 20, 120 can have a hydrophobic interior surface.

The valve 26, 126 can be a suitable valve known to those having ordinary skill in the art, including but not limited to, a capillary valve, a stopcock, a passageway with a removable and replaceable plug for sealing the passageway, a rubber plug configured for use with a syringe, or the like.

Figure 3:
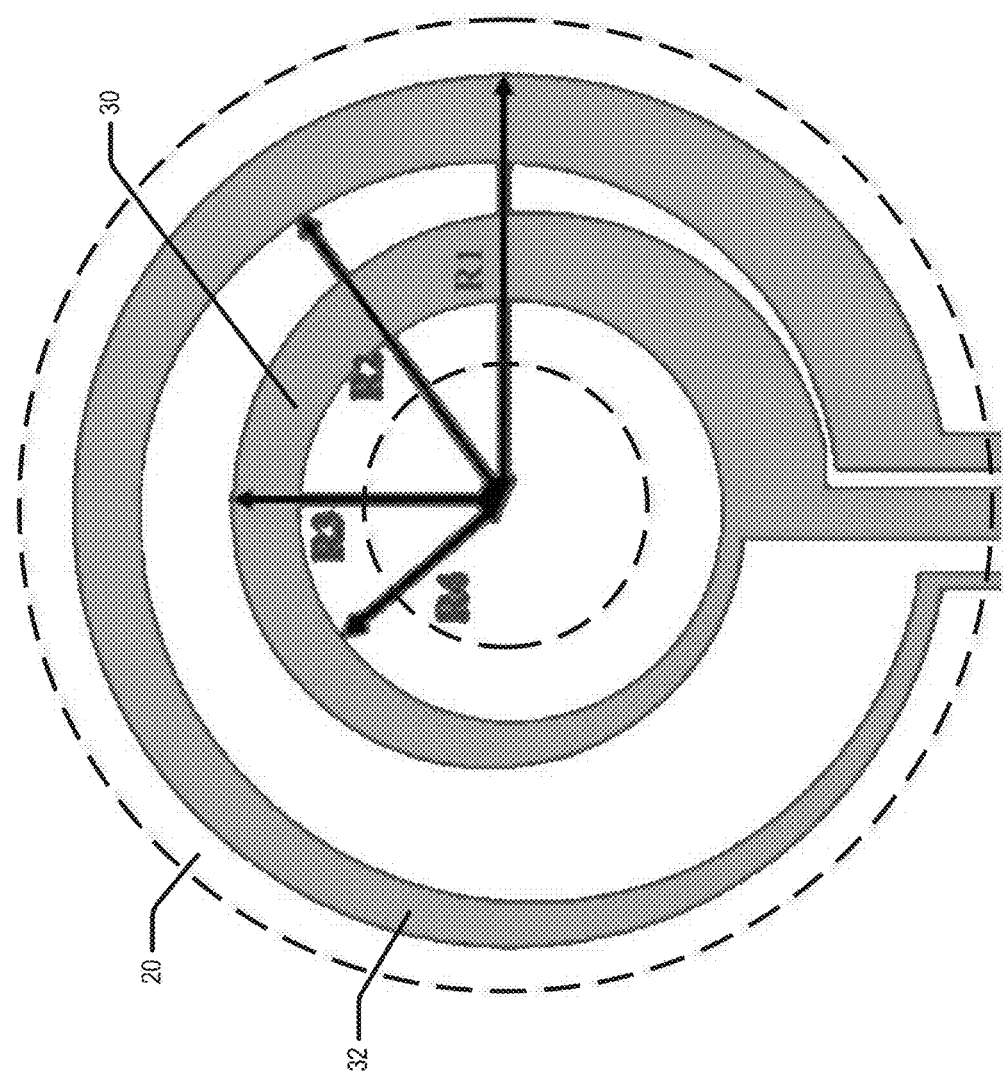
FIG. 3 is a channel including an anode and a cathode, in accordance with one aspect of the present disclosure.

Referring to FIG. 3, one configuration of electrodes is illustrated, showing a channel 20, 120 with an anode 30 and a cathode 32 positioned within the channel 20, 120. In this arrangement, four distinct radial distances are defined as follows: an outer electrode outer radius denoted by R1; an outer electrode inner radius denoted by R2; an inner electrode outer radius denoted by R3; and an inner electrode inner radius denoted by R4.

Figure 4:
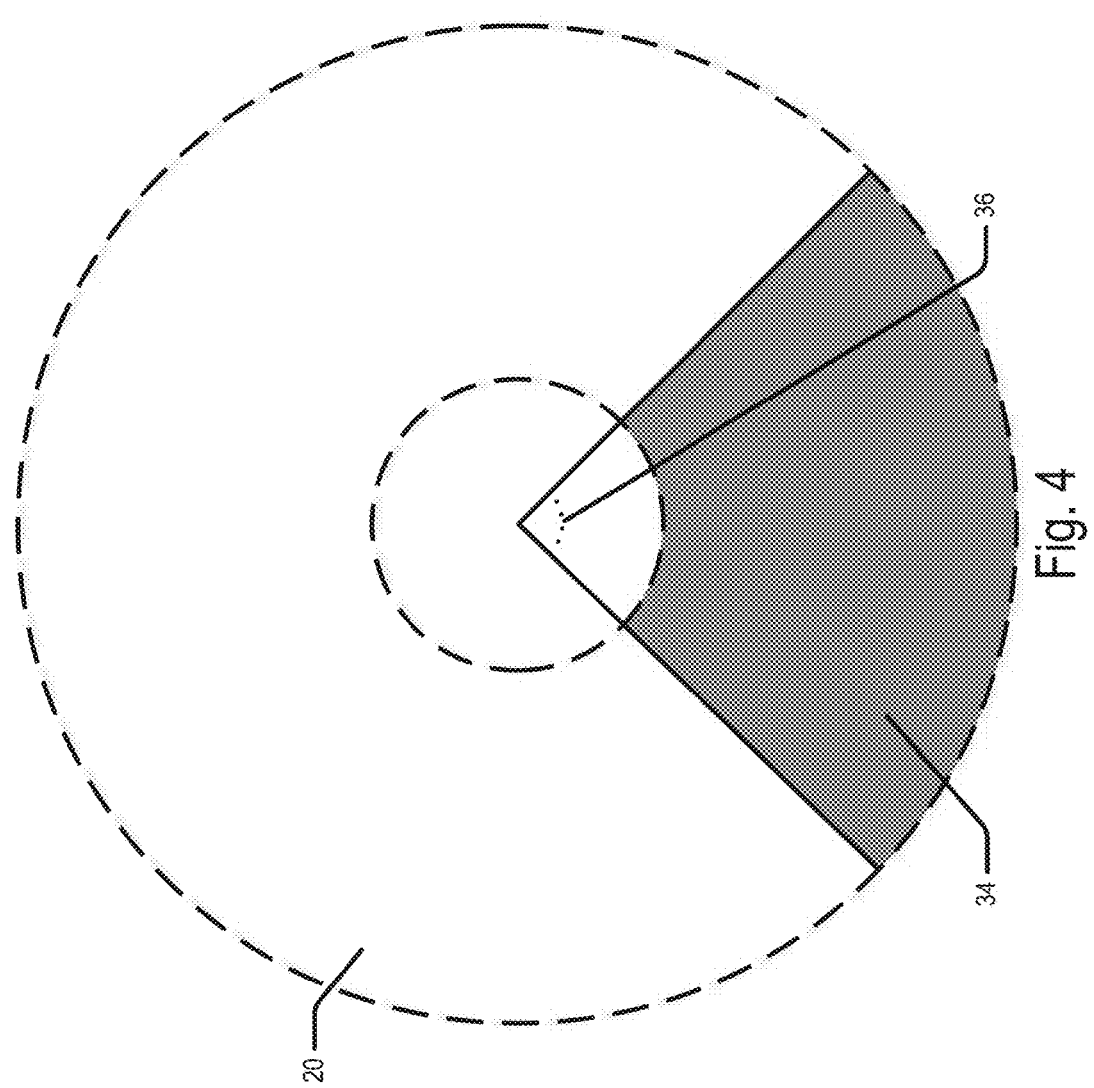
FIG. 4 is a channel including an ionic liquid, in accordance with one aspect of the present disclosure.

Referring to FIG. 4, one configuration of an ionic liquid 34 positioned within the channel 20, 120 is illustrated. The ionic liquid 34 can be configured to cover occupy a predetermined angle 36 of the channel 20, 120. In certain aspects, the ionic liquid 34 can be present in a volume of between 1% and 50% of the internal volume of the channel 20, 120, including but not limited to, a volume of between 5% and 45%, between 10% and 40%, between 15% and 35%, between 20% and 30%, between 25% and 37.5%, between 30% and 42.5%, or between 35% and 47.5%.

Figure 5:
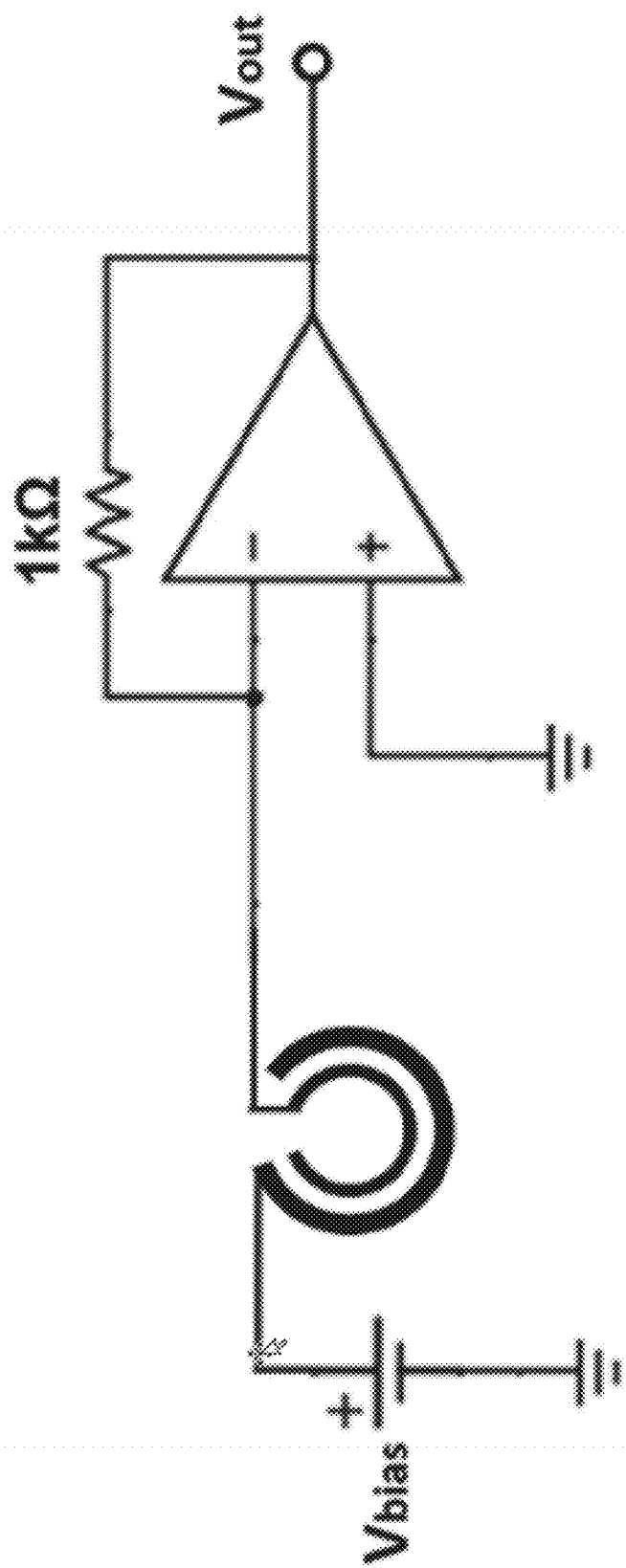
FIG. 5 is a readout circuit, in accordance with one aspect of the present disclosure.

In certain aspects, the controller 18, 118 can apply a non-zero voltage between the anode 30 and the cathode 32. Referring to FIG. 5, a readout circuit is shown, which can be included in and/or utilized by the controller 18, 118 to generate, receive, and/or interpret the rotation sense signal. It should be appreciated that the readout circuit illustrated in FIG. 5 is but one exemplary circuit for use with the present disclosure, and other circuits would be apparent to those having ordinary skill in the art.

It should be appreciated that in all configurations, the anode 30 and the cathode 32 can be switched with one another.

In certain aspects, the anode 30 and/or the cathode 32 can be formed from a conductive electrode material that is suitable for use with MET devices. Examples of suitable conductive electrode materials include but are not limited to, copper, gold, platinum, lead, conductive polymers, and the like. It should be appreciated that other conductive electrode materials than those listed can be used without departing from the scope of the present disclosure.

In operation, the sensor 10, 110 can be positioned such that the axis 28, 128 is at an angle of between 1° and 179° relative to a gravitational axis representing the force of gravity, including but not limited to, an angle of between 10° and 170°, between 15° and 165°, between 20° and 160°, between 30° and 150°, between 45° and 135°, between 60° and 120°, between 65° and 115°, between 70° and 110°, between 75° and 105°, between 80° and 100°, between 85° and 95°, between 86° and 94°, between 87° and 93°, between 88° and 92°, between 89° and 91°, or at an angle of approximately 90° relative to the gravitational axis.

In certain aspects, the anode 30 and the cathode 32 can be configured to provide a unique rotation sense signal value at each angle of rotation about the axis 28, 128. The unique rotation sense signal value can be achieved in a variety of ways and the following examples are intended to be non-limiting. It should be appreciated that the following examples can be utilized independently of one another or in combination. As one example, the anode 30 and/or the cathode 32 can be dimensioned to provide a unique cross-section of coverage by the ionic liquid 34. As another example, the anode 30 and/or the cathode 32 can have a width that changes as a function of angular position relative to the axis 28, 128, and in some cases, the width can have a unique width value at each angular position relative to the axis 28, 128. As yet another example, a distance between the anode 30 and the cathode 32 can change as a function of angular position relative to the axis 28, 128, and in some cases, the distance can have a unique distance value at each angular position relative to the axis 28, 128.

In certain aspects, the sensor 10, 110 can include more than two electrodes, including but not limited to, three, four, five, six, or more electrodes. Using the design principles discussed above with respect to the anode 30 and the cathode 32, a person having ordinary skill in the art would appreciate how to arrange additional electrodes in order to provide further unique rotation sense signals.

Referring to FIG. 5, an exemplary readout circuit is shown. The readout circuit can be utilized by or included within the controller 18, 118.

According to the sensing mechanism of MET, an ionic liquid, such as concentrated iodine-iodide electrolyte containing potassium iodide (KI), lithium iodide (LiI), or iodine ($I_2$) can apply reversible chemical reactions when an electrical voltage is applied between anode and cathode.

On cathodes, reduction of tri-iodide occurs as follows:

$$I_3^- + 2e^- \rightarrow 3I^-. \tag{1}$$

The reverse reaction takes place on anodes, as follows:

$$3I^- - 2e^- \rightarrow I_3^-. \tag{2}$$

Referring to FIG. 5, a plot of a theoretical iodide concentration gradient between the anode and the cathode is shown. The electrical current from the interface of liquid/solid is based on the generation and absorption of tri-iodide ions on the surface of electrodes, which can be mathematically explained as follows:

$$I = Dq\left(\oint_S (\nabla c, n) dS\right) \tag{3}$$

where D is the diffusion coefficient, c is the concentration of the active charge carriers, q is the charge transferred across the interface in a single electrochemical reaction, n is a unit vector normal to the surface of the electrode, and S is the electrode surface area.

Figure 6:
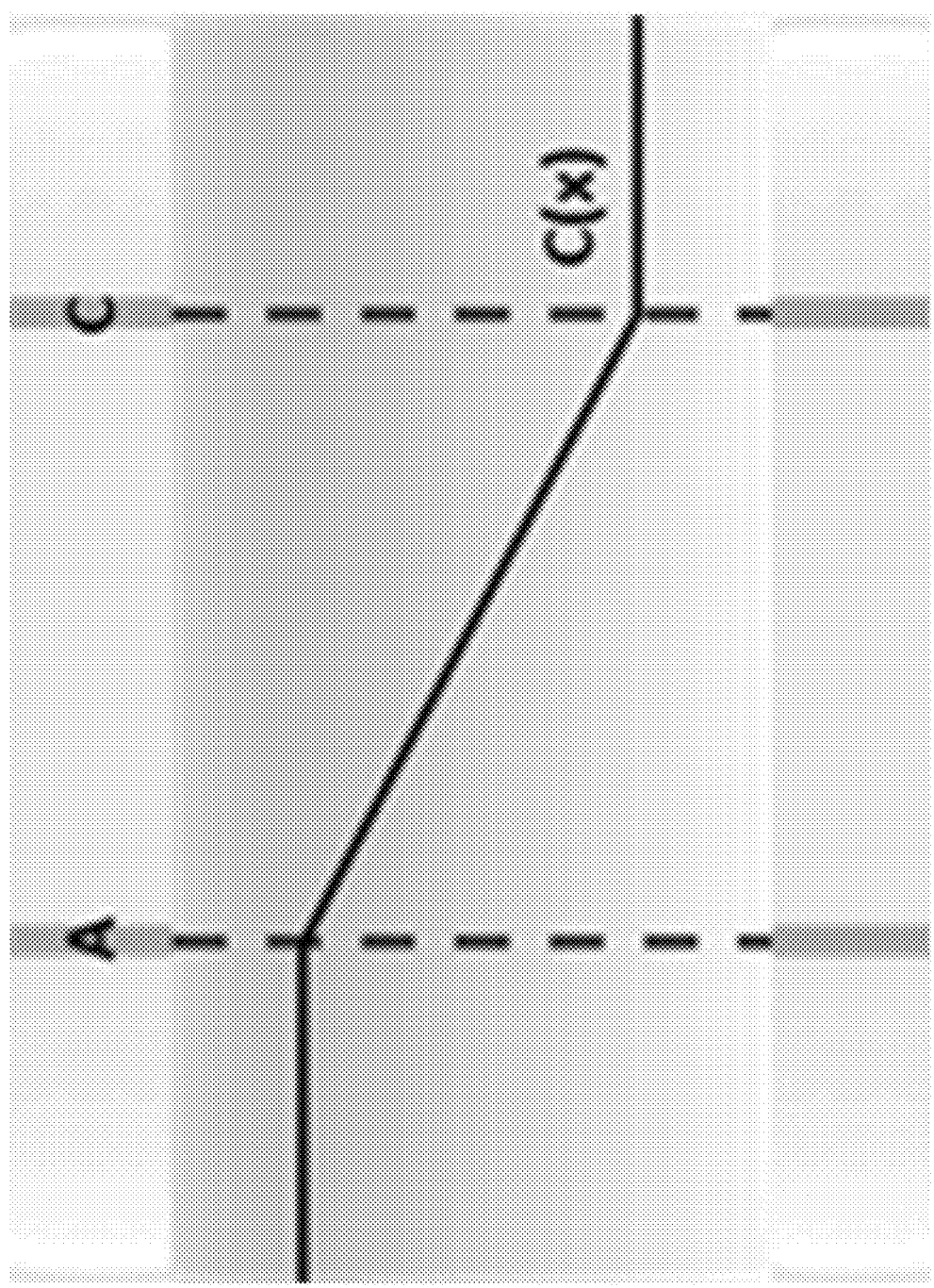
FIG. 6 is a plot illustrating the operational principle of a molecular electronic transducer sensor, in accordance with one aspect of the present disclosure.
Figure 7:
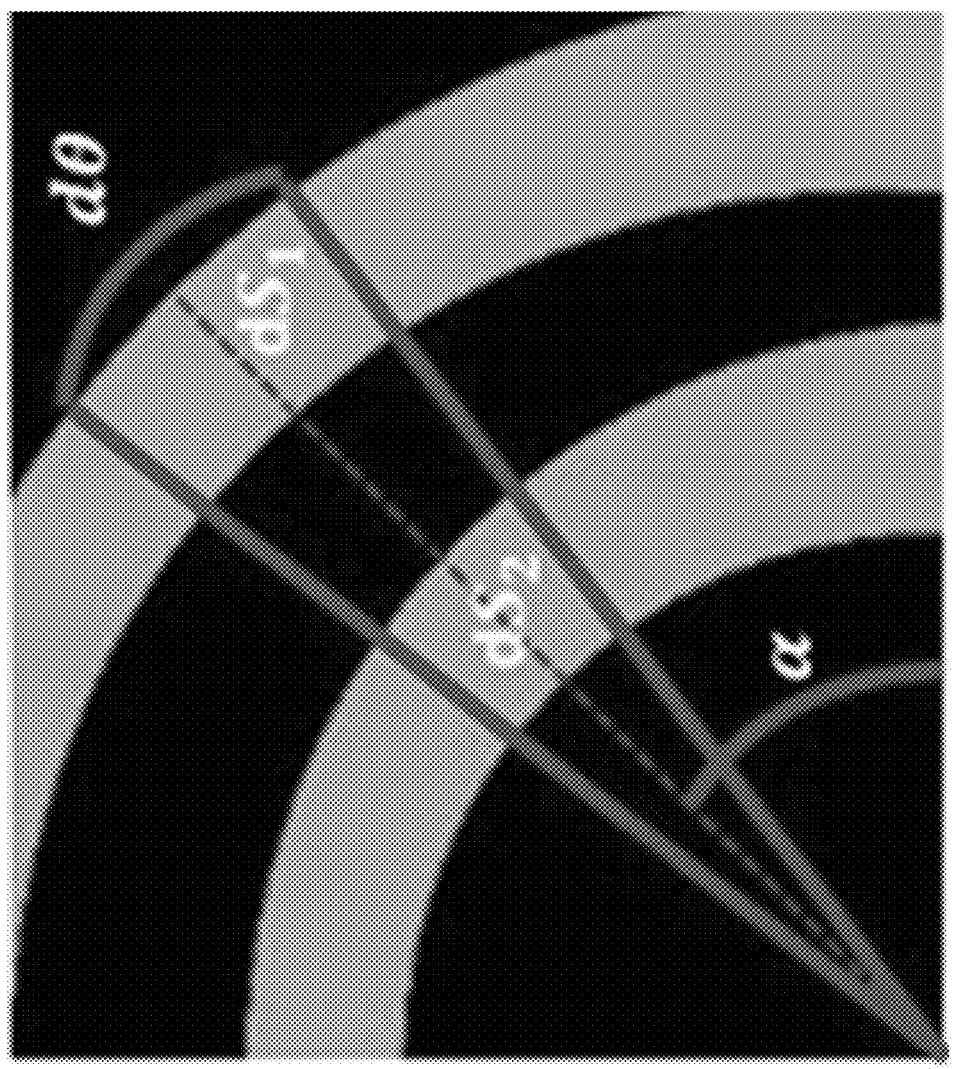
FIG. 7 is a figure showing dimensions of electrodes that are used in calculations, in accordance with one aspect of the present disclosure.

Referring again to FIG. 3, two swirl shaped electrodes are shown, where the surface area of the electrodes changes with the change of the angle of rotation about the axis 28, 128. The output current can be proportional to the surface area of contact electrodes. Referring to FIG. 6, the surface area can be calculated as follows:

$$\begin{cases} dS_1 = \dfrac{d\theta}{2\pi}\pi(R_1^2 - R_2^2) \\ R_2 = (R_{2max} - R_{2min})\dfrac{\alpha}{2\pi} \\ dS_2 = \dfrac{d\theta}{2\pi}\pi(R_3^2 - R_4^2) \\ R_3 = (R_{3max} - R_{3min})\dfrac{\alpha}{2\pi} \end{cases} \tag{4}$$

where dθ is the angle that is covered by the ionic liquid (denoted above by angle 36), dS is the area of electrodes that is covered by the solution, and a is the tilting angle (in other words, the angle of rotation about the axis 28, 128).

With the above conventions and the equations represented in (4), the output current can be calculated as follows:

$$I = Dq(\nabla c, n)\left[\dfrac{d\theta}{2\pi}\pi(R_1^2 - R_2^2) + \dfrac{d\theta}{2\pi}\pi(R_3^2 - R_4^2)\right]. \tag{5}$$

Because each ionic liquid 36 consists of both a cation and an anion, a wide variety of ionic liquids with different properties are possible. Different combinations of cations and anions have different melting and boiling points, different diffusion coefficients, and different viscosities, all of which will have an effect on the performance of the sensor 10, 110.

Ionic liquids are a class of electrolytes that show surprisingly good performance characteristics when used in the sensor 10, 110. Ionic liquids 36 can be a unique collection of liquid materials composed solely of ions. With a combination of many unique properties, such as negligible volatility, non-flammability, excellent thermal and chemical stability, and high ionic conductivity, as well as potential broad applications, there has been increasing attention in ionic liquids. Low temperature ionic liquid electrolytes may be suitable for use in the sensors 10, 110 described herein.

In certain aspects, the ionic liquid 36 can include a cation selected from the group consisting of potassium, lithium, ethylammonium nitrate, 1-butyl-3-methylimidazolium, 1-alkyl-3-methylimidazolium, 1-alkylpyridinium, N-methyl-N-alkylpyrrolidinium, ammonium cations, phosphonium cations, and combinations thereof. The aforementioned cations are not the only cations usable with the present disclosure, but rather, are provided as a non-limiting set of exemplary cations.

In certain aspects, the ionic liquid can include an anion selected from the group consisting of a halide, such as fluoride, chloride, bromide, iodide, or astatide, an inorganic anion, such as tetrafluoroborate or hexafluorophosphate, a large organic anion, such as bistriflimide, triflate, or tosylate, a non-halogenated organic anion, such as formate, alkylsulfate, alkylphosphate, or glycolate, and combinations thereof. The aforementioned anions are not the only anions usable with the present disclosure, but rather, are provided as a non-limiting set of exemplary anions.

In certain aspects, the ionic liquid is an iodide ionic liquid, which features iodide as the anion. Since iodide is the ion involved in iodide/triiodide redox reactions, an iodide ionic liquid electrolyte can increase the concentration of charge carriers in the electrolyte and thus improve the sensitivity of the device. Iodide ionic liquids also have wide liquid temperatures and, in particular, low freezing points. However, iodide ionic liquids are usually high viscosity, which reduces their effectiveness. Indeed, ionic liquids generally exhibit a tradeoff between low viscosity and a wide temperature range. This problem can be solved with the addition of a solvent such as water or lactic acid which features an OH group which can act as a hydrogen bond donor. The ionic liquid then acts as a hydrogen bond acceptor, and the two liquids together form a LTTM with a lower freezing point than either liquid in its pure state. While too much water creates an electrolyte not substantially different than a KI in water solution, smaller amounts of water (or lactic acid, ethylene glycol, etc.) form an electrolyte with unique properties including high ion density, a high ability to dissolve metal halides, and simultaneously low freezing points and viscosities. For example, a mixture of 73% [bmim][I], 18% water, and 9% LiI (by mass) has an extremely wide temperature range with a melting point of −93° C. and a boiling point of 189° C. This liquid temperature range has been confirmed by differential scanning calorimetry. This mixture also exhibits a high resolution signal in the MET when compared to KI-in-water mixtures.

In certain aspects, the ionic liquid can have a water content of less than 25% by mass, or less than 20% by mass.

The ionic liquid 36 can comprise a material selected from the group consisting of a metal halide, a compound comprising a metal and a chalcogen, and combinations thereof. The ionic liquid can further comprise a material selected from the group consisting of potassium iodide, sodium iodide, lithium iodide, 1-butyl-3-methyl-imidazolium iodide, ethylammonium nitrate, and combinations thereof.

The ionic liquid 36 can also comprise a material having an OH group. In certain aspects, the material having an OH group can be a liquid. Without wishing to be bound by any particular theory, it is believed that addition of the material having an OH group can serve as a hydrogen bond donor, thus providing a low transition temperature mixture with a freezing point that is lower than the ionic liquid in its pure state.

In certain aspects, the ionic liquid 36 can further include nanoparticles. The nanoparticles can be metal nanoparticles of polymer-based nanoparticles. Metal nanoparticles consisting of gold, platinum or palladium can act as catalysts speeding the electrochemical reaction at the electrodes and thus increasing the sensitivity of the MET to convective transfer of ions. Nanoparticles formed of hydrophobic polymers, meanwhile, may reduce noise within the sensor signal by stabilizing the hydrophobic ionic liquid cations.

An output as described herein can include any measurable signal that contains interpretable information. The interpretable information can contain the rotation sense signal. The systems and methods described herein can further include any circuits, electronics, processor, and the like that are necessary for processing the output or rotation sense signal, as would be appreciated by a person having ordinary skill in the art.

In certain aspects, the present disclosure provides a method of making a sensor 10, 110. The method of making a sensor 10, 110 can include one or more of the following steps: forming a solid structure 12, 112 comprising a channel 20, 120 that circumnavigates an axis 28, 128; positioning a first anode 30 and a first cathode 32 within the channel 20, 120; and introducing an ionic liquid 34 to the channel. The ionic liquid can contact the first anode 30 and the first cathode 32 when the sensor 10, 110 is positioned such that the axis 28, 128 is at an angle of between 1° and 179° relative to a gravitational axis representing the force of gravity.

Forming the solid structure 12, 122 can include bonding a capping layer 24 comprising the channel 20, 120 to a surface of a substrate 22. Positioning the first anode 30 and the first cathode 32 within the channel 20, 120 can comprise depositing the first anode 30 and the first cathode 32 onto the surface of the substrate 22. The depositing can be prior to the bonding. The bonding and/or the depositing can be configured to position the first anode 30 and the first cathode 32 within the channel 20, 120.

The capping layer 24 and the channel 20 disposed therein can be formed by methods known to those having ordinary skill in the art, including but not limited to, molding, such as injection molding, three-dimensional printing, and the like.

It should be appreciated that the entirety of the sensor 10, 110, including the solid structure 12, 112, the first anode 30, and the first cathode 32, can be formed by a single technique such as three-dimensional printing.

Figure 8:
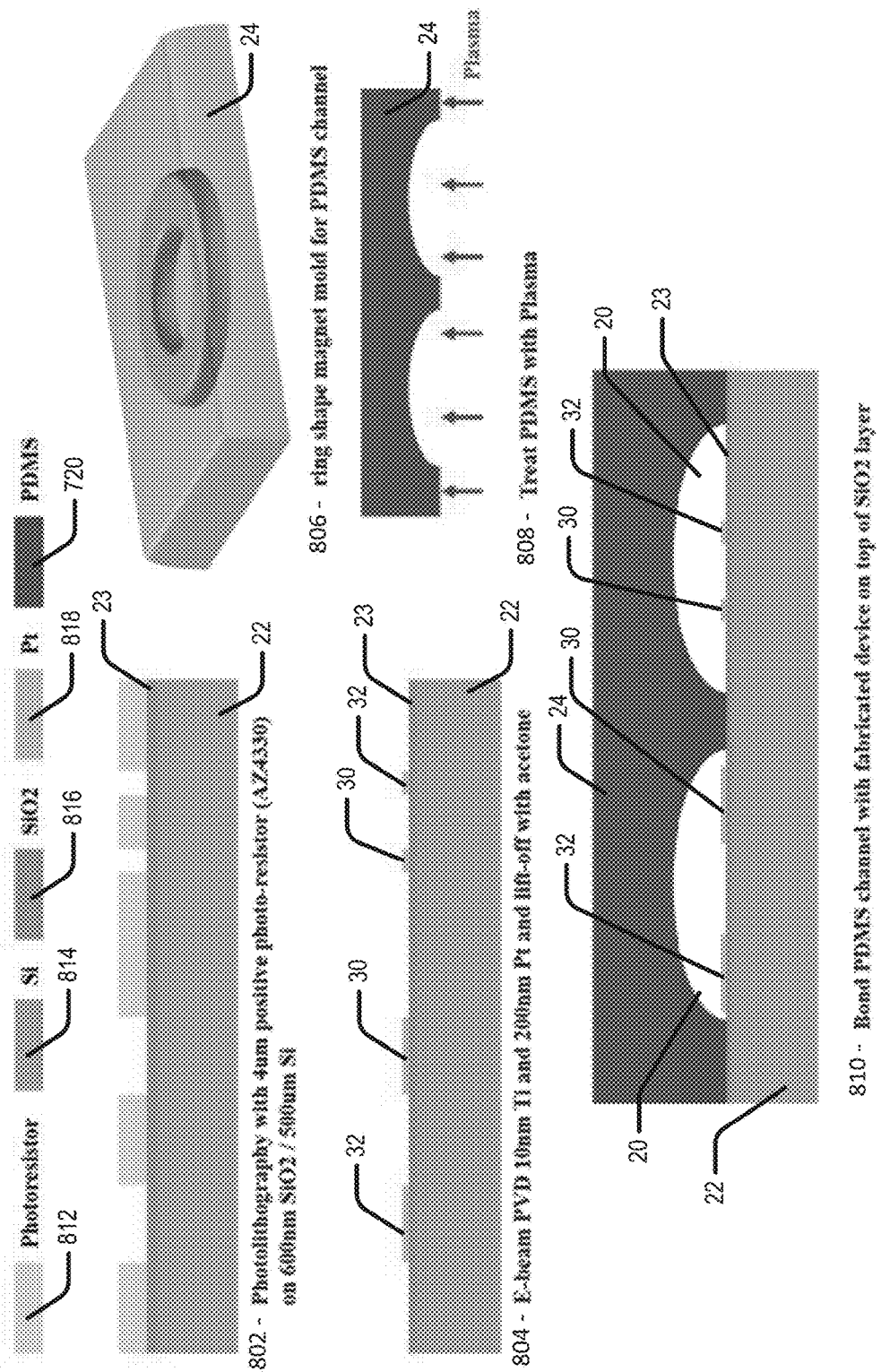
FIG. 8 is a schematic representation of a method of making a sensor, in accordance with one aspect of the present disclosure.

Referring to FIG. 8, a schematic representation of one specific method of making a sensor is illustrated. In this exemplary aspect, the materials used are a photoresitor 812, Si 814, $SiO_2$ 816, Pt 818, and polydimethyl siloxane 720. It should be appreciated that other materials, such as those listed above and others known to those having ordinary skill in the art to be suitable replacements for those listed above, are contemplated and can be used with the present method.

Referring to schematic 802 in FIG. 8, a photoresistor is photolithographically deposited onto the surface of the substrate 22. The Si substrate 22 has a surface oxidation layer 23 of $SiO_2$. The photoresistor is deposited onto the surface of the substrate 22 in a pattern such that is the negative of the desired electrode pattern.

Referring to schematic 804 in FIG. 8, the anode 30 and cathode 32 are deposited onto the surface of the substrate 22 in the negative pattern defined by the photoresistor.

Referring to schematic 806 in FIG. 8, the capping layer 24 including the channel 20, 120 is formed.

Referring to schematic 808 in FIG. 8, the capping layer 24 is treated to have properties suitable for use with the ionic liquid 34. The treatment can be plasma treatment, chemical treatment, or the like.

Referring to schematic 810 in FIG. 8, the capping layer 24 is bonded to the substrate 22. The bonding positions the anode 30 and cathode 32 within the channel 20, 120.

In one specific aspect, the substrate can be a polished silicon wafer with a 600 nm $SiO_2$ layer on the top side. Two E-beam PVD 10 nm Ti/200 nm Pt swirl shaped electrodes can be deposited on top of the $SiO_2$ layer by a lift-off process. A PDMS ring-shaped channel can be made with a ring-shaped magnet. Oxygen plasma treating can be performed on the surface of the PDMS channel, which activates the surface for bonding with the $SiO_2$. A 1% Cytop (hydrophobic) coating can be coated in the channel The final step can be bonding the PDMS channel to the top of the $SiO_2$ layer. Iodide ionic liquid solutions can be injected into the channel in a known volume.

In certain aspects, the present disclosure provides a method of using a sensor 10, 110 to measure rotation of an object about an axis 28, 128. The method of using a sensor 10, 110 to measure rotation of an object about an axis 28, 128 can include one or more of the following steps: affixing the sensor 28, 128 to the object such that the axis 28, 128 is at an angle of between 1° and 179° relative to a gravitational axis representing the force of gravity; and measuring a rotation sense signal.

EXAMPLES

Example 1

Two samples were prepared and characterized.

Figure 9:
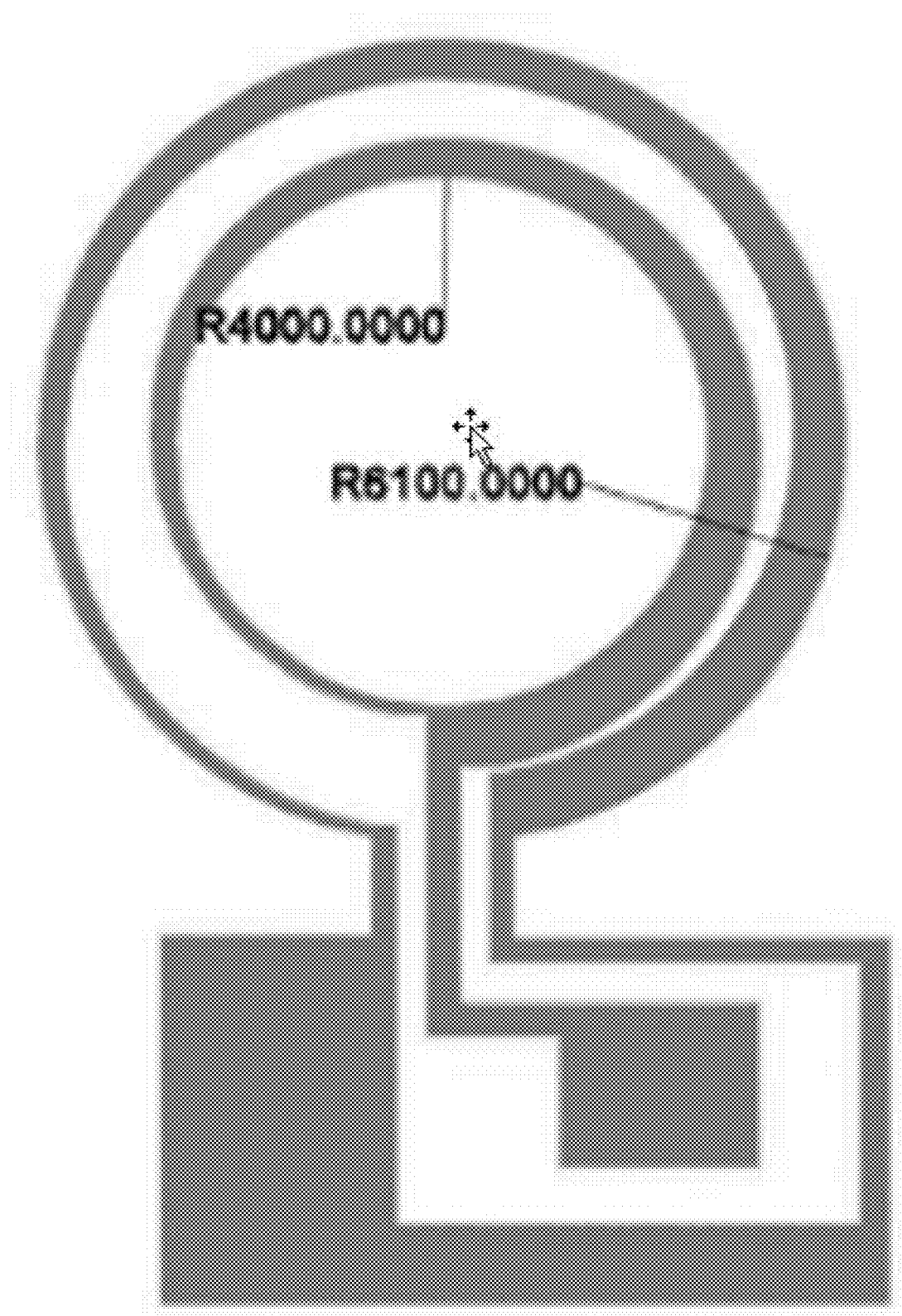
FIG. 9 is an electrode layout for Sample 1 of Example 1.

Sample 1 included the electrode configuration shown in FIG. 9 and was prepared using the method and materials shown in FIG. 8. The PDMS channel width was 14 mm and the height was 2.5 mm. The electorodes max width was 1000 µm and the minimum width was 200 µm. The outer swirl radius was 6.1 mm and the inner radius was 4.0 mm. The applied DC voltage between electrodes was 0.5 V. 1-butyl-3-methylimidazolium with lithium iodide was used as the ionic liquid and the contact angle was 132°. The current output from the sensor was converted to a voltage signal by a trans-impedance amplifier.

Figure 10:
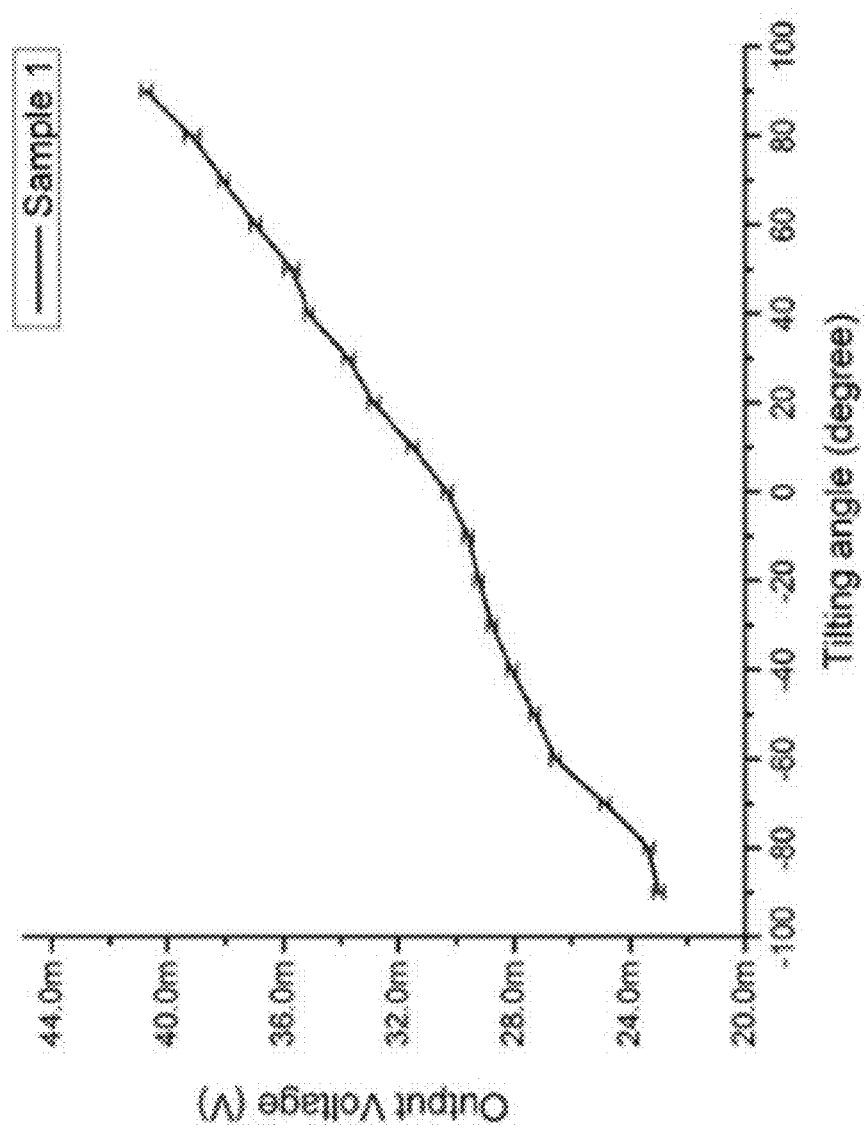
FIG. 10 is a plot of output voltage versus tilting angle for Sample 1 of Example 1.
Figure 11:
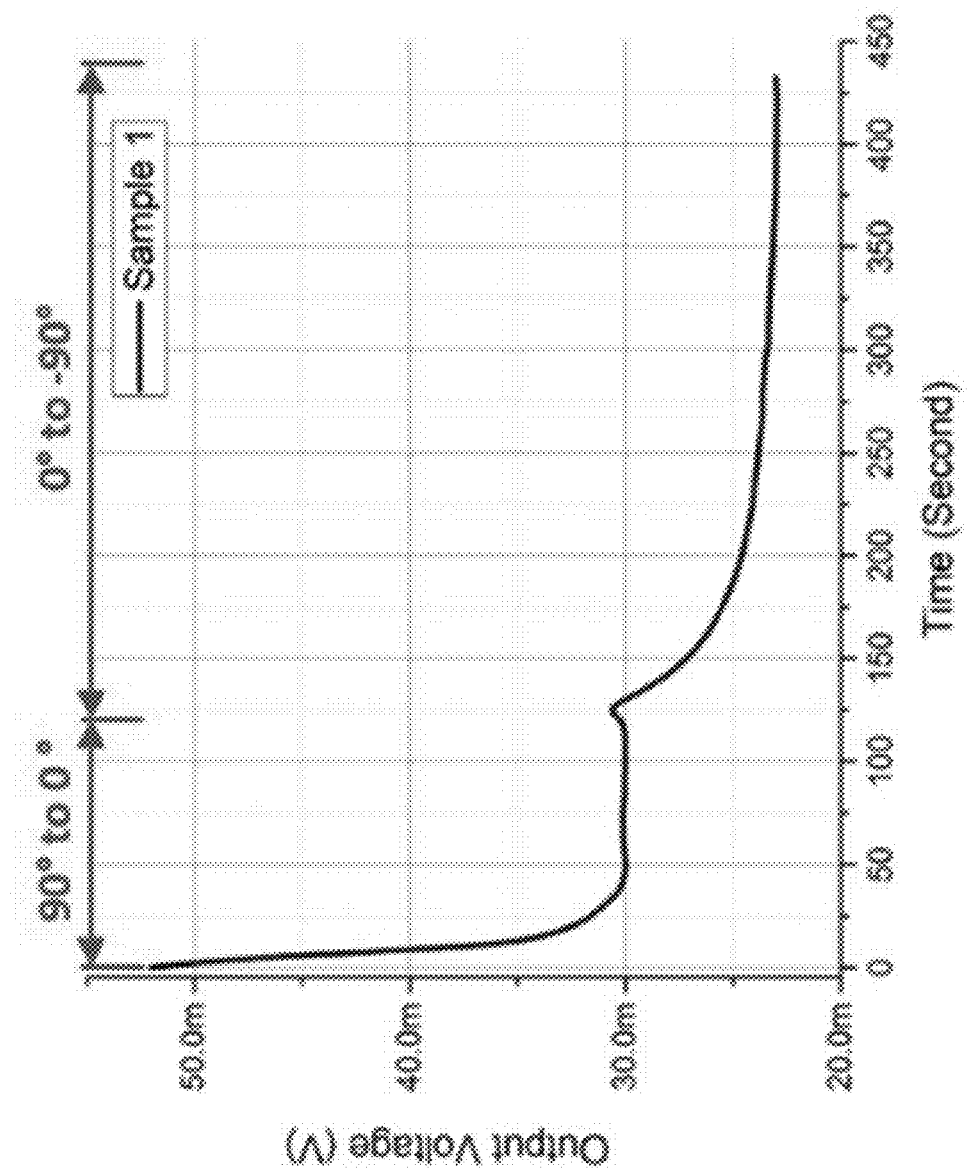
FIG. 11 is a plot showing response time for Sample 1 of Example 1.

Sample 1 was rotated from −90° to 90°. Referring to FIG. 10, a plot of output voltage versus tilting angle is shown. The output voltage tracks roughly linearly with the tilting angle. Referring to FIG. 11, a plot of output voltage versus time is shown to illustrate the response time of the sensor. The response time for rotation from 90° to 0° was 48 seconds and the response time for rotation from 0° to −90° was 250 seconds.

Figure 12:
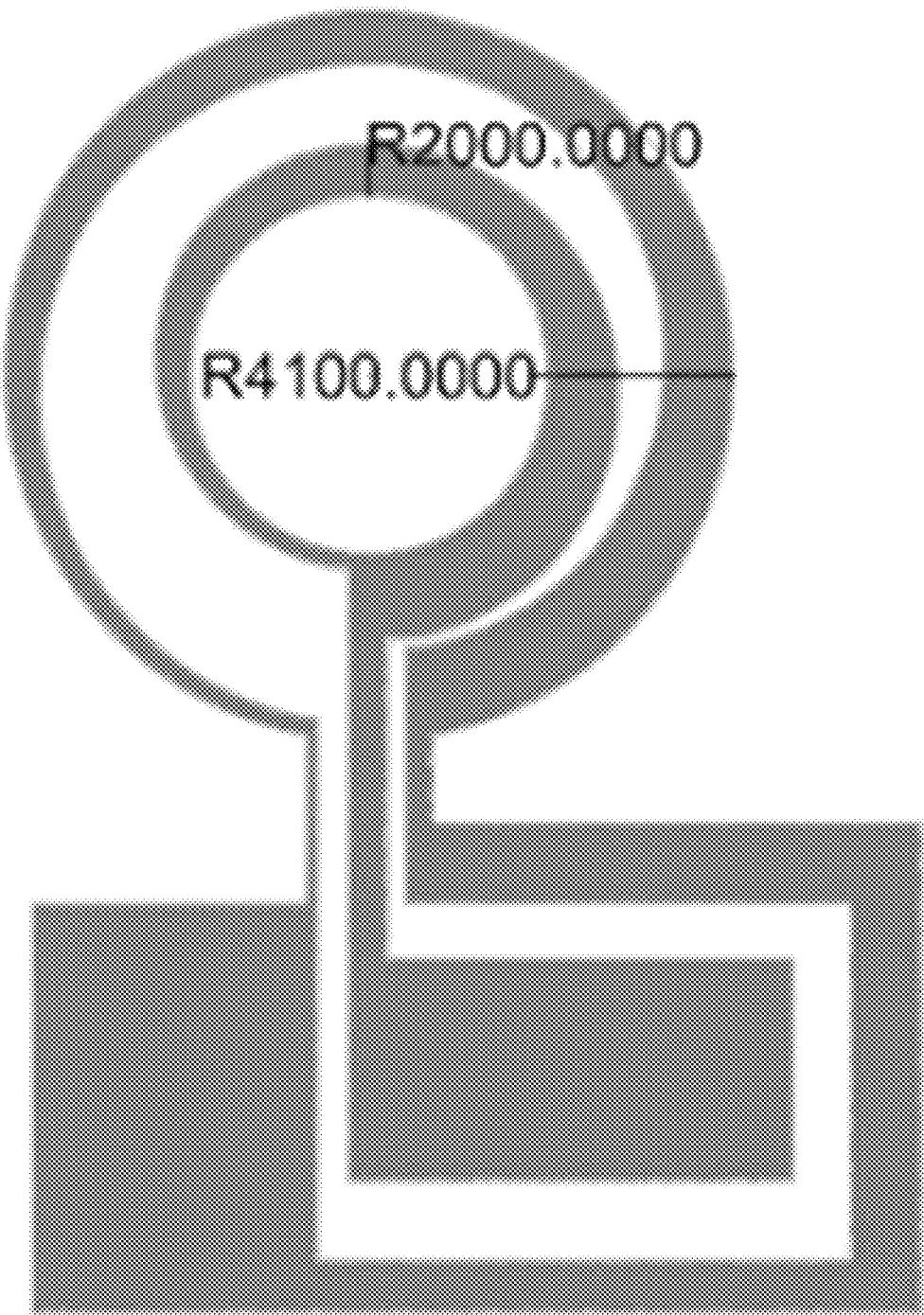
FIG. 12 is an electrode layout for Sample 2 of Example 1.

Sample 2 included the electrode configuration shown in FIG. 12 and was prepared using the method and materials shown in FIG. 8. The PDMS channel width was 14 mm and the height was 1.5 mm. The electrodes max width was 1000 µm and the minimum width was 200 µm. The outer swirl radius was 4.1 mm and the inner radius was 2.0 mm. The applied DC voltage between electrodes was 0.5 V. 1-butyl-3-methylimidazolium with lithium iodide was used as the ionic liquid and the contact angle was 30.6°. The current output from the sensor was converted to a voltage signal by a trans-impedance amplifier.

Figure 13:
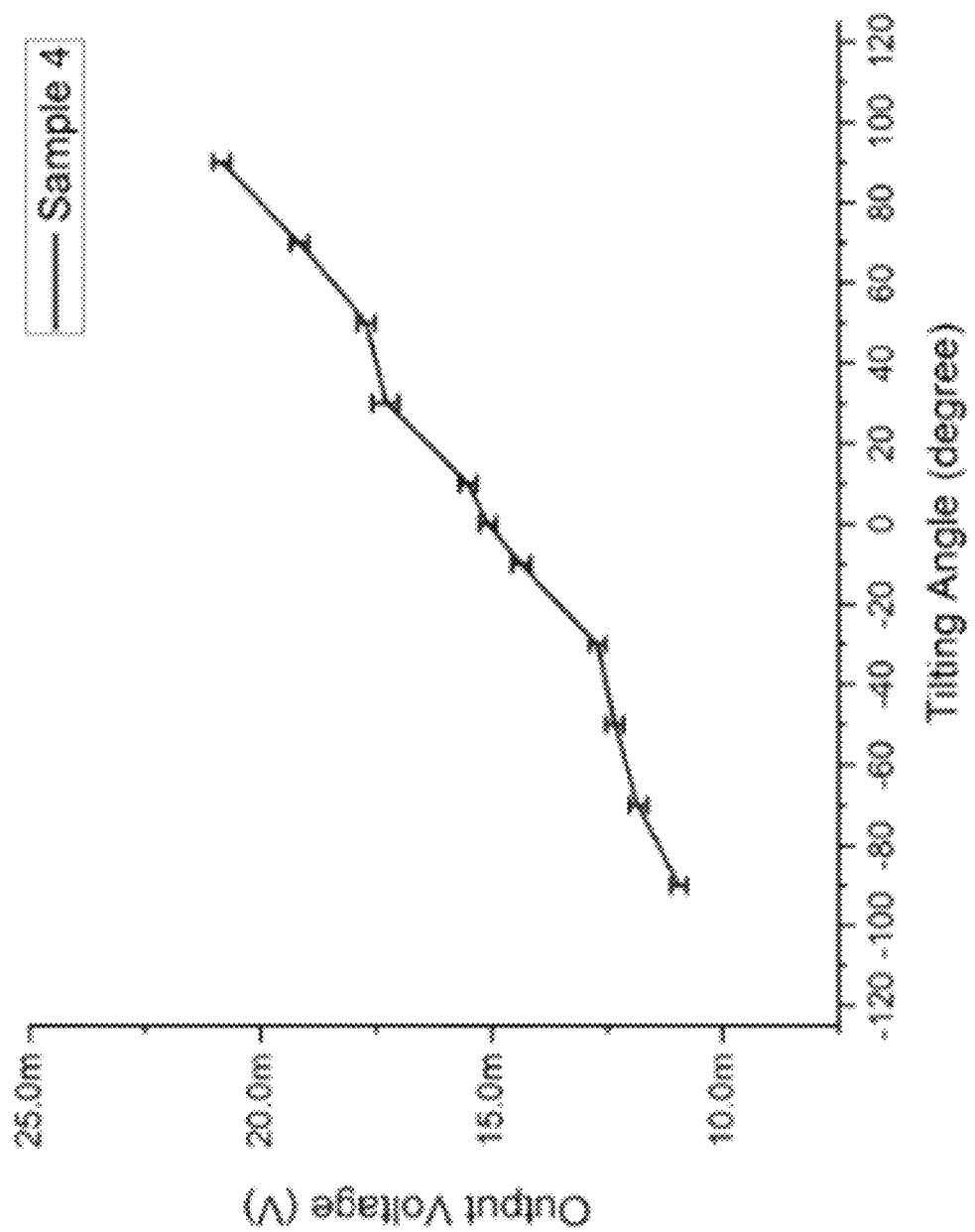
FIG. 13 is a plot of output voltage versus tilting angle for Sample 2 of Example 1.
Figure 14:
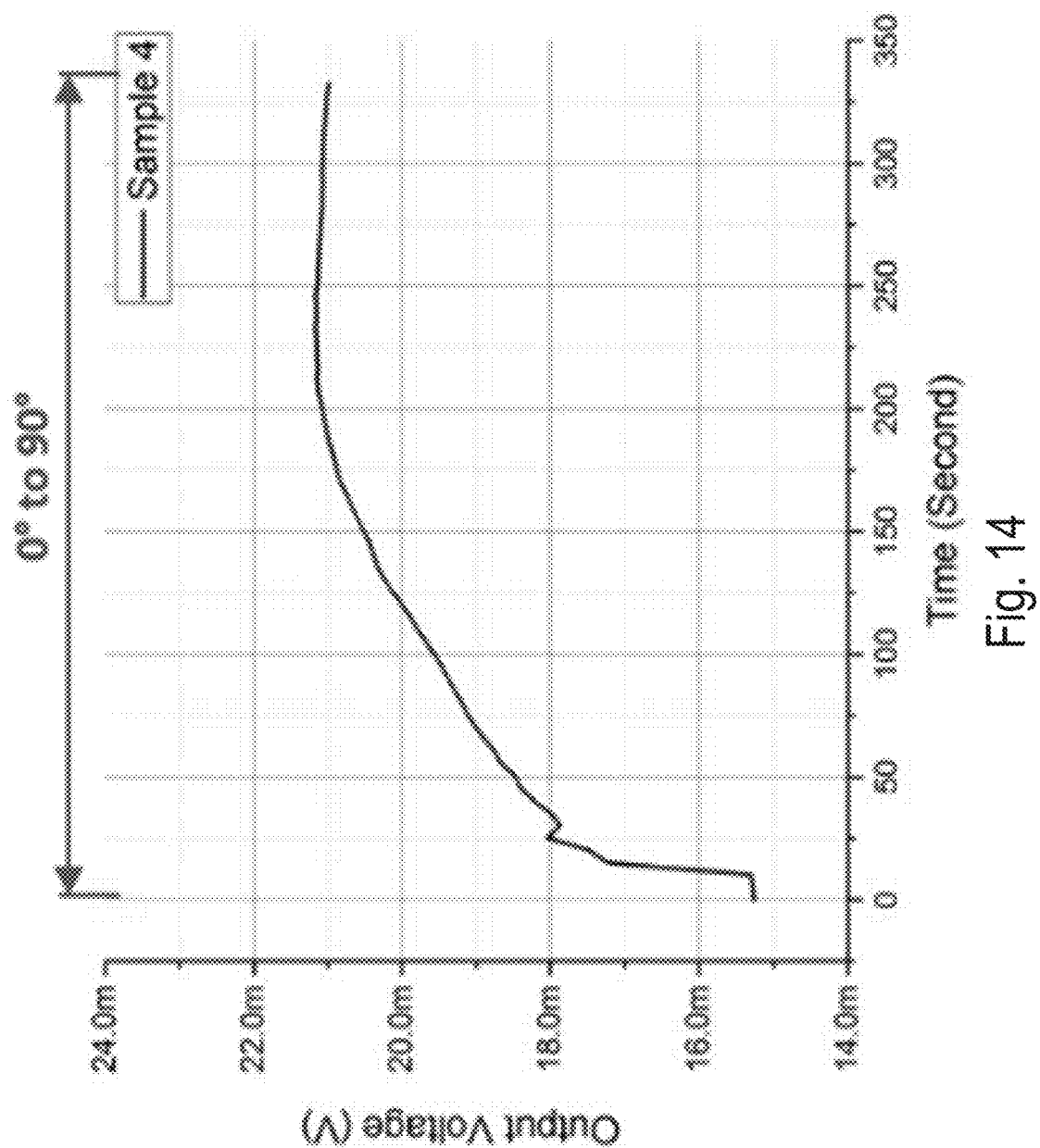
FIG. 14 is a plot showing response time for Sample 2 of Example 1.

Sample 2 was rotated from −90° to 90°. Referring to FIG. 13, a plot of output voltage versus tilting angle is shown. The output voltage tracks roughly linearly with the tilting angle. Referring to FIG. 14, a plot of output voltage versus time is shown to illustrate the response time of the sensor. The response time for rotation from 0° to 90° was 200 seconds.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the disclosures described herein can be embodied within a form that does not provide all of the features and benefits set forth herein, as some features can be used or practiced separately from others. The scope of certain disclosures disclosed herein is indicated by the appended claims rather than by the foregoing description. All changes which come within the meaning and range of equivalency of the claims are to be embraced within their scope.

We claim:

1. A sensor for measuring rotation about an axis, the sensor comprising:
   a solid structure comprising a channel that circumnavigates the axis;
   a first anode and a first cathode disposed within the channel;
   an ionic liquid positioned within the channel, the ionic liquid contacting the first anode and the first cathode when the sensor is positioned such that the axis is at an angle of between 1° and 179° relative to a gravitational axis representing the force of gravity; and
   a controller coupled to the first anode and the first cathode, the controller configured to apply a first non-zero voltage between the first anode and the first cathode, the controller configured to communicate a rotation sense signal corresponding to a rotation about the axis, wherein the first anode and the first cathode are configured to provide a unique rotation sense signal value at each angle of rotation about the axis.

2. The sensor of claim 1, wherein the first anode and/or the first cathode is dimensioned to provide a unique cross-section of coverage by the ionic liquid at each angle of rotation about the axis.

3. The sensor of claim 1, wherein the first anode and/or the first cathode has a unique width at each angular position relative to the axis.

4. The sensor of claim 1, wherein the first anode and/or the first cathode has a width that changes as a function of angular position relative to the axis.

5. The sensor of claim 4, wherein the width has a unique width value at each angular position relative to the axis.

6. The sensor of claim 1, wherein a distance between the first anode and the first cathode changes as a function of angular position relative to the axis.

7. The sensor of claim 6, wherein the distance between the first anode and the first cathode has a unique distance value at each angular position relative to the axis.

8. The sensor of claim 1, wherein the channel has a circular shape in a plane normal to the axis.

9. The sensor of claim 1, wherein the channel has an internal volume of between 0.001 µL and 0.05 mL.

10. The sensor of claim 1, wherein the solid structure is monolithic.

11. The sensor of claim 1, wherein the solid structure comprises two or more sub-structures.

12. The sensor of claim 11, wherein the two or more sub-structures comprise a substrate and a capping structure.

13. The sensor of claim 12, wherein the substrate and the capping structure are sealed to one another and the channel is formed between the substrate and the capping structure.

14. The sensor of claim 1, wherein the ionic liquid is present in a volume of between 1% and 50% of an internal volume of the channel.

15. The sensor of claim 1, wherein the ionic liquid comprises a material selected from the group consisting of a metal halide, a compound comprising a metal and a chalcogen, and combinations thereof.

16. The sensor of claim 1, wherein the ionic liquid comprises a material selected from the group consisting of potassium iodide, sodium iodide, lithium iodide, 1-butyl-3-methyl-imidazolium iodide, ethylammonium nitrate, and combinations thereof.

17. The sensor of claim 1, the solid structure further comprising a valve through which the ionic liquid can be added to or removed from the channel.

18. A method of measuring rotation of an object about an axis using a sensor, the sensor comprising a solid structure comprising a channel that circumnavigates the axis, the sensor comprising a first anode and a first cathode disposed within the channel, the sensor comprising an ionic liquid positioned within the channel, the ionic liquid contacting the first anode and the first cathode when the sensor is positioned such that the axis is at an angle of between 1° and 179° relative to a gravitational axis representing the force of gravity, the sensor comprising a controller coupled to the first anode and the first cathode, the controller configured to apply a first non-zero voltage between the first anode and the first cathode, the controller configured to communicate a rotation sense signal corresponding to a rotation about the axis, wherein the first anode and the first cathode are configured to provide a unique rotation sense signal value at each angle of rotation about the axis, the method comprising:

affixing the sensor to the object such that the angle is between 1° and 179° relative to the gravitational axis; and measuring the rotation sense signal.

19. A method of making a sensor, the method comprising:

forming a solid structure comprising a channel that circumnavigates an axis;

positioning a first anode and a first cathode within the channel; and introducing an ionic liquid to the channel, the ionic liquid contacting the first anode and the first cathode when the sensor is positioned such that the axis is at an angle of between 1° and 179° relative to a gravitational axis representing the force of gravity.

20. The method of claim 19, wherein forming the solid structure comprising the channel that circumnavigates the axis comprises bonding a capping layer comprising the channel to a surface of a substrate, and wherein positioning the first anode and the first cathode within the channel comprises depositing, prior to the bonding, the first anode and the first cathode onto the surface of the substrate, wherein the bonding is configured to position the first anode and the first cathode within the channel.

* * * * *